United States Patent [19]

Hashimoto

[11] Patent Number: 4,506,290

[45] Date of Patent: Mar. 19, 1985

[54] WHITE BALANCING APPARATUS FOR COLOR TELEVISION CAMERAS

[75] Inventor: Takaaki Hashimoto, Noda, Japan

[73] Assignee: Nippon Kogaku K.K., Tokyo, Japan

[21] Appl. No.: 421,910

[22] Filed: Sep. 23, 1982

[30] Foreign Application Priority Data

Oct. 1, 1981 [JP] Japan .................................. 56-154751

[51] Int. Cl.³ ............................................... H04N 9/04
[52] U.S. Cl. .......................................... 358/29; 358/40
[58] Field of Search ....................... 358/29, 40, 41, 217

[56] References Cited

U.S. PATENT DOCUMENTS

| | | | |
|---|---|---|---|
| 3,821,789 | 6/1974 | Durbin | 358/29 |
| 4,355,325 | 10/1982 | Nakamura | 358/29 |
| 4,395,730 | 7/1983 | Shen | 358/29 |

Primary Examiner—Michael A. Masinick
Attorney, Agent, or Firm—Michael N. Meller

[57] ABSTRACT

A white balancing apparatus for color television cameras, which varies the response of color temperature compensation in accordance with the rate of change of the color temperature of the light illuminating an object to be shot by the camera. The apparatus includes a variable time constant circuit and a time constant control circuit which are connected between a color temperature detecting circuit and the chromaticity signal circuit of the TV camera, whereby the time constant is decreased and the response of color temperature compensation is made fast when the output variation of the color temperature detecting circuit deviates from a predetermined offset range.

5 Claims, 3 Drawing Figures

WHITE BALANCING APPARATUS FOR COLOR TELEVISION CAMERAS

BACKGROUND OF THE INVENTION

The present invention relates to a white balancing apparatus for color television cameras.

DESCRIPTION OF THE PRIOR ART

When a scene or object is shot by a color television camera, the light illuminating the object may be any one of lights of various natures, such as, bright sun or overcast, sunny or open shade, early morning or evening in the case of outdoor shooting and incandescent light or fluorescent light in the case of indoor shooting and thus the tones in the televised scene vary in dependence on the illuminating light correspondingly. Usually, the color television camera is basically adjusted so as to precisely reproduce the colors of a shot object which is generally illuminated at a color temperature of 3,200 K. and the white balance is adjusted such that a white object is reproduced in white, thereby ensuring precise reproduction of the colors. One method of effecting the white balance adjustment is to insert color temperature conversion filters before the lens optically. There are other methods of adjusting the gain of the R (red) signal circuit and the B (blue) signal circuit of the camera in accordance with the G (green) signal circuit as a reference or adjusting the gain of the R, B and G signal circuits, respectively. In particular, the latter methods include one in which a so-called color temperature selector switch is used to select any one of a number of preset values, e.g., two indoor and outdoor values or a greater number of values preset into each circuit and another method in which after the color temperature selection, a white object, e.g., a white sheet of paper, is shot or the lens is covered with a milk-white cap and a white balance adjusting knob is turned in accordance with a white balance indicator, thereby continuously adjusting the balance of the R, G and B signals and effecting the white balance adjustment more finely. However, since each of these conventional white balance adjusting methods is performed as a preparatory operation prior to the shooting, if the illuminating light changes during the shooting, as for example when the scenes shift from the indoor to the outdoor, the white balance is lost and the tones of the picture become unnatural. Conceivable measures for overcoming these deficiencies include arranging it so that while shooting scenes, the operator of the camera operates the white balance adjusting circuit as desired to adjust the white balance in response to the color temperature of the illuminating light varying continuously during the shooting or the operator continues to operate the white balance adjusting circuit at all times. In such case, it is not desirable if the white balance adjusting circuit comes into operation in response to each very small change of the illuminating light or of the position of sensors for sensing the color temperature of the illuminating light and consequently a time constant circuit (low-pass filter) is used to provide a dead zone such that very small changes or changes of a short duration are regarded as noise and the white balance adjusting circuit is prevented from responding to such changes. However, if such a dead zone is provided which is constant at all times, this gives rise to a further problem that when large changes or sudden changes occur in the illuminating light, as for example when the scenes shift successively from an indoor to an outdoor setting, an excessive time is required for the white balance to follow the changes and the shifting in the tones of the picture become unnatural.

SUMMARY OF THE INVENTION

It is the primary object of the invention to provide a white balancing apparatus so designed that during the white balancing of a color television camera, a time constant circuit is made responsive to changes of very small magnitude or short duration in the color temperature of the illuminating light during a series of shooting operations, thereby correspondingly decreasing the response of color temperature compensation. Furthermore, the time constant circuit is made unresponsive to changes in the color temperature of the illuminating light which are greater than a given value, thereby providing color temperature compensation with improved response, whereby variations in the color temperature of the illuminating light during the continuous shooting are continuously detected and compensated for and the televised scenes are made to appear more natural.

In accordance with the invention there is thus provided a white balancing apparatus for automatically adjusting the gain of a chromaticity signal circuit of a color television camera in accordance with the output of a color temperature detecting circuit. This white balancing apparatus comprises a variable time constant circuit for providing a desired time constant to the output of the color temperature detecting circuit, and a time constant control circuit for varying the time constant of the variable time constant circuit in accordance with the output value of the color temperature detecting circuit, whereby the time constant of the variable time constant circuit is made relatively large through the time constant control circuit and the white balance response is made slow when the output value of the color temperature detecting circuit varies within a predetermined range of variations, and the time constant of the variable time constant circuit is made relatively small or reduced to zero and the white balance response is made fast when the color temperature variation is greater than the predetermined range of variations, thereby causing the tones in the picture to vary more naturally in response to the continuous variation or shifting in the illuminating light.

The above and other objects as well as advantageous features of the invention will become more clear from the following description taken in conjunction with the attached drawings.

DESCRIPTION OF THE PREFERRED EMBODIMENTS

Figure 1:
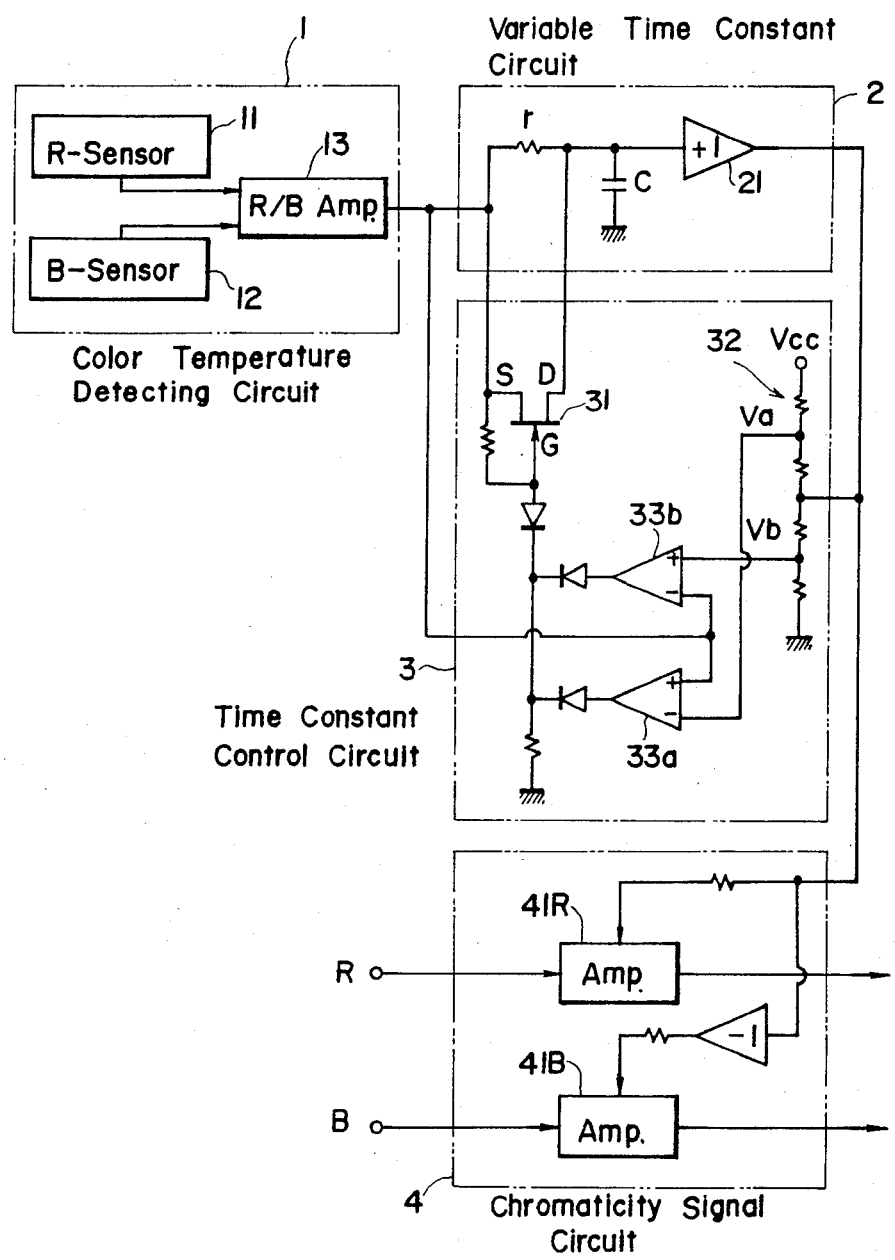
FIG. 1 is a circuit diagram of an embodiment of the invention with a part shown in block diagram form.

In FIG. 1 illustrating a block diagram for a first embodiment of the invention, numeral 1 designates a color temperature detecting circuit for detecting the color temperature of an illuminating light of an object for shooting, 2 a variable time constant circuit for providing the output of the color temperature detecting circuit 1 with a desired time constant (in the illustrated embodiment a time constant $T_1 = r_1 \cdot C_o$ which is determined by a resistor r of resistance value $r_1$ and a capacitor C of capacitance value $C_o$ or a very small time constant $T_o$), 3 a time constant control circuit responsive to the output value of the color temperature detecting circuit to change the time constant of the variable time constant circuit 2 to the said $T_1$ or $T_o$, for example, and 4 a chromaticity signal circuit for adjusting the gain of the R and B signal circuits of a camera.

The color temperature detecting circuit 1 comprises a sensor 11 for sensing the red component of the light illuminating the shot scene, a sensor 12 for sensing the blue component and an operational amplifier 13 for computing a ratio R/B of the outputs from the sensors 11 and 12. The same effect can of course be obtained by applying the outputs of the sensors 11 and 12 to a logarithmic amplifier and producing a difference output.

The variable time constant circuit 2 comprises the fixed resistor r and the capacitor C as time constant elements and it is designed so that by substantially short-circuiting the ends of the resistor r through the time constant control circuit 3 as mentioned later, it is possible to selectively change the time constant from the $T_1 = r_1 \cdot C_o$ to the very small time constant $T_o = r_o \cdot C_o$ which is practically zero.

The time constant control circuit 3 comprises an analog switch 31 consisting of a field effect transistor for substantially short-circuiting the ends of the resistor r to reduce its resistance to a very small value $r_o$, a bleeder circuit 32 whereby the output of the time constant circuit 2 applied through a buffer amplifier 21 is divided by resistors with respect to a constant dc voltage Vcc, thereby generating voltage level signals Va and Vb which are respectively slightly higher and lower than the output of the time constant circuit 2, and comparators 33a and 33b each thereof comparing the output of the color temperature detecting circuit 1 or the input of the time constant circuit 2 with the output of the time constant circuit 2 on the basis of the given offset which is established by the bleeder circuit 32 and turning on the analog switch 31 when said input deviates from the offset. The chromaticity signal circuit 4 is provided in the color signal circuits of the TV camera (not shown) and it comprises a variable gain amplifier 41R responsive to the output of the buffer amplifier 21 of the time constant circuit 2 to adjust the gain of the R signal circuit of the camera and a variable gain amplifier 41B for adjusting the gain of the B signal circuit of the camera in response to the buffer amplifier output which is inverted in polarity.

The output of the color temperature detecting circuit 1 represents a ratio R/B of the R (red) and B (blue) components in the higher illuminating the shot scene and the ratio R/B does not change much so long as the illuminating light source remains unchanged. However, if the scenes shift from the indoor to the outdoor, the tones in the scene vary unnaturally. As a result, where the variation of the ratio R/B is small, that is, where the output of the color temperature detecting circuit 1 varies slightly due to the position of the camera or the surrounding conditions even with the illuminating light source remaining the same or the circumstances slightly vary momentarily due to a sway of the object to be shot or the like, the output of the time constant circuit 2 is generated with the slow and sufficient time constant $T_1 = r_1 \cdot C_o$, that is, the gain control input of the chromaticity signal circuit 4 is varied slowly and the white balance adjustment is effected slowly so as to prevent the picture from appearing unnatural when viewed. When, for example, the illuminating light source changes so that the ratio R/B varies greatly, the comparator 33a or 33b generates an output so that the analog switch 31 is turned on and the ends of the resistor r are substantially short-circuited, thereby reducing the time constant of the time constant circuit 2 to a value $T_o$ which is close to zero. In other words, the comparator 33a generates an output when the R/B is higher than Va and the comparator 33b generates an output when the R/B is lower than Vb. Thus, the analog switch 31 is turned on by one of the comparators only when the R/B deviates from the offset range between the signals Va and Vb and the analog switch 31 is kept on only so long as the ratio R/B is within the offset range. In this way, the gain control of the chromaticity signal circuit 4 is effected slowly with the sufficient time constant $T_1$ when the ratio R/B is within the offset range and the gain control of the chromaticity signal circuit 4 is carried out with the faster response when the ratio R/B is outside the offset range.

Figure 2:
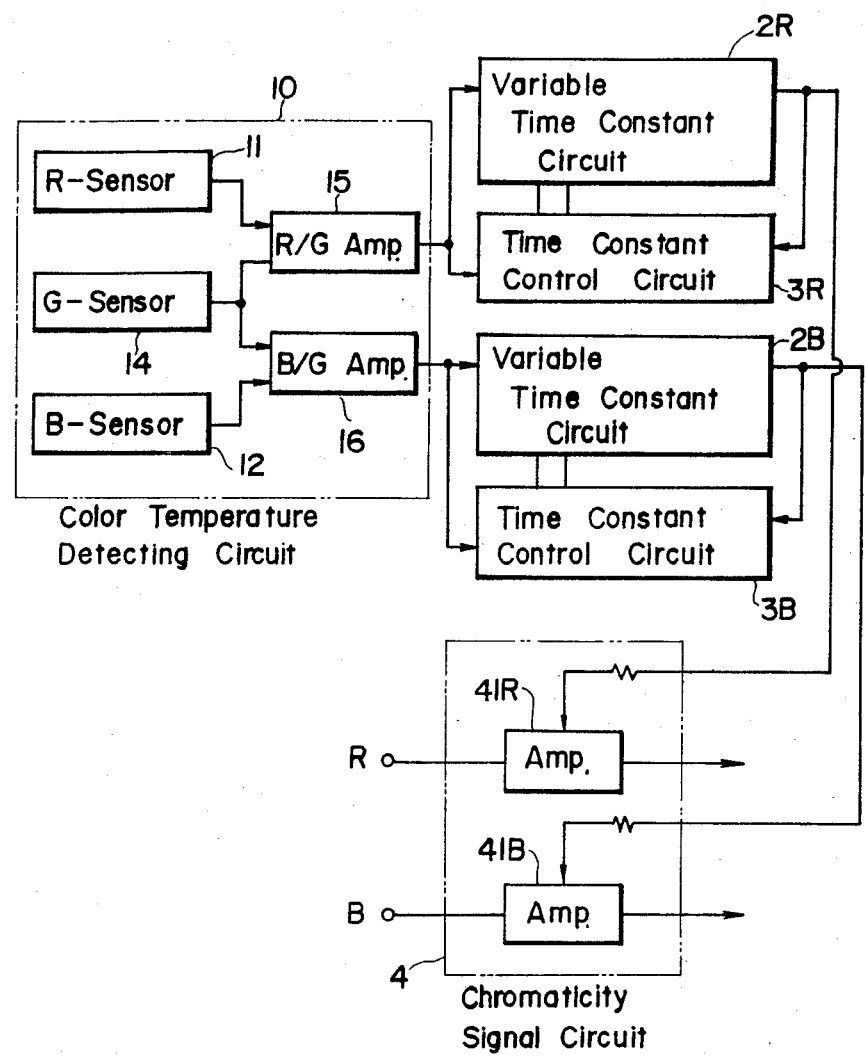
FIG. 2 is a block circuit diagram showing another embodiment of the invention.

While, in the embodiment shown in FIG. 1, the R and B sensors 11 and 12 are used for color temperature sensing purposes and their outputs are processed by the amplifier 13 serving as a divider to obtain an R/B value and thereby determine its level, in accordance with another embodiment shown in FIG. 2 a color temperature detecting circuit 10 comprises R, G and B sensors 11, 12 and 14 so that the illuminating light color component signals produced by these sensors are converted to R/G and B/G values through amplifiers 15 and 16, each serving as a divider, and the levels of the R/G and B/G are determined. Thus, variable time constant circuits 2R and 2B and time constant control circuits 3R and 3B, which are identical with their counterparts in FIG. 1, are separately provided for the R and B systems, respectively, and the outputs of the time constant circuits 2R and 2B respectively control a gain control amplifier 41R for the R signal circuit and a gain control amplifier 41B for the B signal circuit independently of each other.

The present invention is not limited to the above-described color temperature detecting circuits and color temperature detecting circuits of various other types may also be used. Also, the variable time constant circuit is not limited to the illustrated construction and various other devices such as a variety of low-pass filters and other elements which serve the function of eliminating noise components including high frequency components, small signals, etc., may also be used.

While, in the embodiments of FIGS. 1 and 2, the time constant is switched and changed to zero or a predetermined value depending on whether each color temperature detecting circuit output exceeds either of the predetermined threshold values, the control circuit construction may be easily modified such that the time constant of the variable time constant circuit is continuously varied in proportion to variations in the output value of the color temperature detecting circuit.

Figure 3:
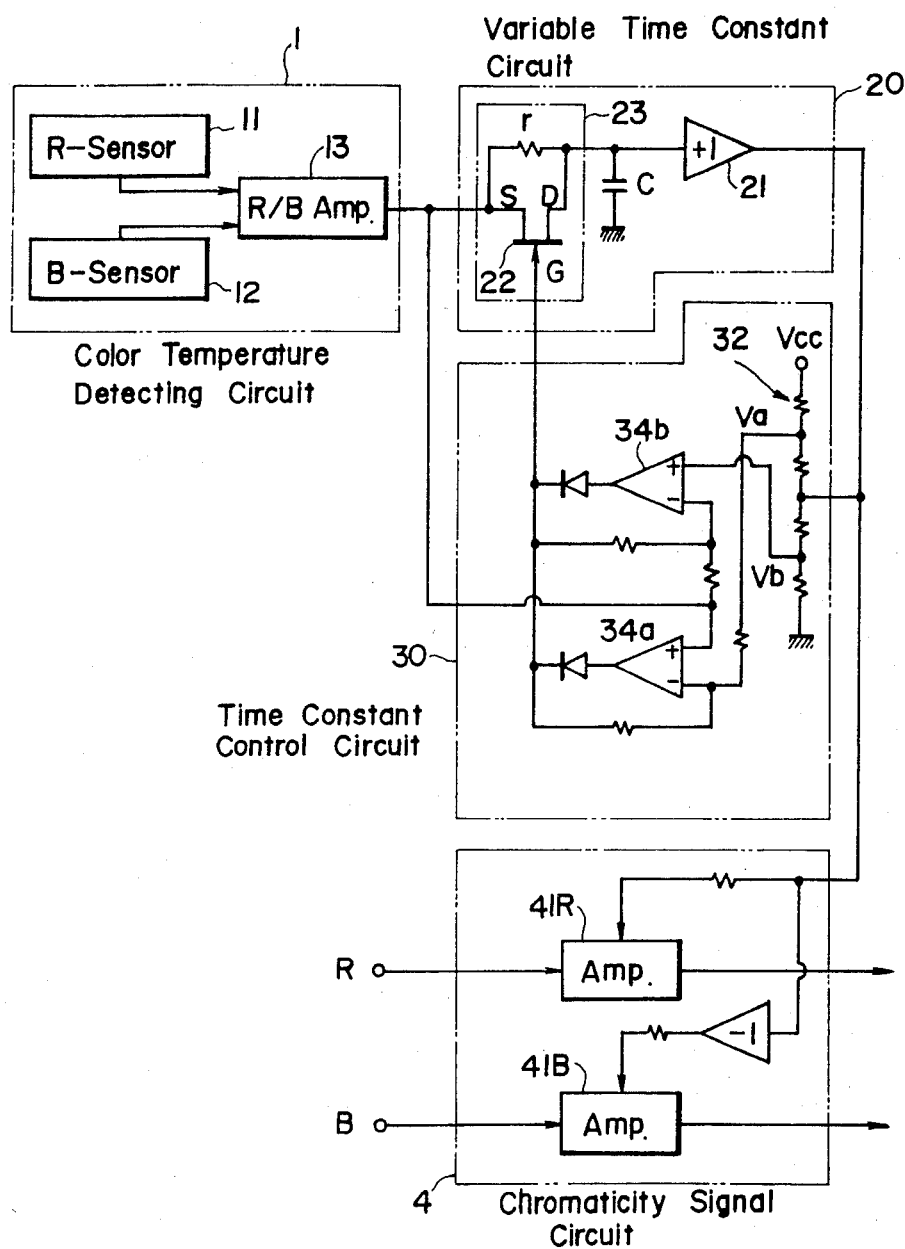
FIG. 3 is a block circuit diagram showing still another embodiment of the invention.

FIG. 3 illustrates still another embodiment adapted for this purpose and it differs from the embodiment of FIG. 1 in that a variable time constant circuit 20 for receiving at its input the output of the color temperature detecting circuit 1 includes a variable resistor circuit 23 in which a resistor r or the resistor element of the time constant elements is connected across the source and drain of a field effect transistor 22. Also, in a time constant control circuit 30, a negative feedback is applied to each of operational amplifiers 34a and 34b so that its gain is reduced and it serves as a linear amplifier. In response to the magnitude of the input signal applied from the color temperature detecting circuit 1, the amplifiers 34a and 34b respectively generate an output corresponding to the input signal level when the input signal is higher than a voltage level Va and when the input signal is lower than a voltage level Vb, respectively, and the two outputs are combined and applied to the gate electrode of the transistor 22 in the variable resistor circuit 23. The remaining circuit construction is the same as that of the embodiment of FIG. 1. In the embodiment of FIG. 3, the gate of the transistor 22 is controlled linearly so that the resistance value across the resistor r is changed linearly and hence the time constant of the variable time constant circuit 20 is controlled continuously in proportion to the output of the color temperature detecting circuit 1.

While, in the embodiments described above, the gain of the R and B signal circuits are controlled, it is of course possible to control the gain of the R, G and B signal circuits, respectively.

From the foregoing description it will be seen that in accordance with the white balancing apparatus of this invention the white balance response is made slow when the color temperature of the light illuminating the shot scene varies within a relatively small range and the white balance response is made fast when the color temperature varies beyond the range of variations, thereby causing the white balance adjustment to follow continuous variations in the color temperature of the light illuminating the shot scene during the shooting without causing the tones in the picture to vary unnaturally.

What is claimed is:

1. In a white balancing apparatus for automatically adjusting the gain of chromaticity signal circuits of a color television camera in accordance with an output of a color temperature detecting circuit for detecting the color temperature of light illuminating an object to be shot by the camera, the combination comprising:
   at least one variable time constant circuit for providing an output of said color temperature detecting circuit with a desired time constant; and
   at least one time constant control circuit for varying the time constant of said variable time constant circuit in accordance with the value of an output of said color temperature detecting circuit.

2. An apparatus according to claim 1, wherein said color temperature detecting circuit generates a signal corresponding to a ratio R/B between red and blue components R and B of said illuminating light; whereby the gains of said chromaticity signal circuits for the red and blue color signals are controlled by said variable time constant circuit and said time constant control circuit.

3. An apparatus according to claim 1, wherein said color temperature detecting circuit generates a first signal corresponding to a ratio R/G between a red component R and a green component G of said illuminating light and a second signal corresponding to a ratio B/G between a blue component B and the green component G of said illuminating light, and wherein a set comprising one of said variable time constant circuits and one of said time constant control circuits is provided for each of said red and blue components, whereby one of said sets is used for the gain control of a red color signal from said chromaticity signal circuit according to said first signal and the other of said sets is used for the gain control of a blue color signal from said chromaticity signal circuit according to said second signal.

4. An apparatus according to claim 1, wherein said variable time constant circuit includes a fixed resistor forming one of the time constant elements thereof, and wherein said time constant control circuit includes circuit means for establishing a predetermined offset range extending between two voltage levels which are respectively higher and lower than the output voltage of said variable time constant circuit, switch means for changing the resistance value of said fixed resistor to one or the other of two values, and comparator means for operating said switch means to change the resistance value of said fixed resistor to the smaller one of said two values when the output voltage of said color temperature detecting circuit deviates from said offset range.

5. An apparatus according to claim 1, wherein said variable time constant circuit includes variable resistor means forming one of the time constant elements thereof, and wherein said time constant control circuit includes circuit means for establishing a predetermined offset range extending between two voltage levels which are respectively higher and lower than the output voltage of said variable time constant circuit, and linear amplifier means for varying the resistance value of said variable resistor means in accordance with an output voltage of said color temperature detecting circuit deviating from said offset range.

* * * * *